United States Patent [19]

Lepori et al.

[11] Patent Number: 5,108,507
[45] Date of Patent: Apr. 28, 1992

[54] AQUEOUS EMULSIONS OF POLYISOCYANATES AND PROCESS FOR PREPARING THEM

[75] Inventors: Agostino Lepori; Domenico Camaioni, both of Varese, Italy

[73] Assignee: Presidenza del Consiglio dei Ministri Ufficio del Ministro per il Coordinamento delle Iniziative per la Ricerca Scientifica e Tecnologica, Rome, Italy

[21] Appl. No.: 740,853

[22] Filed: Jul. 31, 1991

Related U.S. Application Data

[63] Continuation of Ser. No. 327,607, Mar. 23, 1989, abandoned.

[30] Foreign Application Priority Data

Mar. 30, 1988 [IT] Italy .................. 20027 A/88

[51] Int. Cl.⁵ ............... C08L 1/28; C08L 1/32
[52] U.S. Cl. ................. 106/170; 106/186; 536/88
[58] Field of Search ............ 106/170, 186; 536/88

[56] References Cited

U.S. PATENT DOCUMENTS

| | | | |
|---|---|---|---|
| 3,880,831 | 4/1975 | Senju et al. | 536/88 |
| 3,936,441 | 2/1976 | Holst et al. | 536/88 |
| 4,066,828 | 1/1978 | Holst et al. | 536/88 |
| 4,068,067 | 1/1978 | Holst et al. | 536/88 |

OTHER PUBLICATIONS

*Paint, Oil and Chemical Review*, Mar. 30, 1950, p. 23.
CA87(4):25058j, 1977, Shackle.
CA98(6):36398y, 1982, Paquot et al.
CA83(18):149309d, 1975, Sakurada et al.
CA83(18):149186m, 1975, Sakurada et al.

*Primary Examiner*—Theodore Morris
*Assistant Examiner*—David M. Brunsman
*Attorney, Agent, or Firm*—Stevens, Davis, Miller & Mosher

[57] ABSTRACT

Aqueous emulsions of polyisocyanates comprising at least one cellulose derivative dissolved in water, and at least one polyisocyanate having a low, medium and/or high molecular weight.

8 Claims, No Drawings

AQUEOUS EMULSIONS OF POLYISOCYANATES AND PROCESS FOR PREPARING THEM

This application is a continuation of application Ser. No. 07/327,607, filed Mar. 23, 1989, now abandoned.

DESCRIPTION OF THE INVENTION

The present invention relates to aqueous emulsions of polyisocyanates, and to a process for preparing them.

More particularly, the present invention relates to aqueous emulsions of polyisocyanates, to a process for preparing them, and to their use as binding agents for cellulosic materials.

By the term "polyisocyanate", as used in the present specification and in appended claims, those organic compounds having a low, medium and/or high molecular weight are meant, which contain at least two —NCO groups.

Examples of low molecular weight polyisocyanates are those having the general formula:

$$OCN-R-NCO \qquad (I)$$

wherein R represents an alkyl, cycloalkyl, aryl, alkyl-aryl radical of from 1 to 25 carbon atoms, such as meta- and/or para-phenylene-diisocyanate, 2,4-toluene-diisocyanate either alone or in admixture with its isomer 2,6-toluene-diisocyanate, 4,4'-di-phenyl-methane-diisocyanate, hexamethylenediisocyanate, 4,4'-di-cyclohexyl-methane-diisocyanate, 1-isocyanato-3-isocyanato-methyl-3,5,5-trimethyl-cyclohexane (also known as isophorone-diisocyanate), 2,2,4-tri-methyl-hexamethylene-diisocyanate in admixture with its isomer 2,2,6-tri-methyl-hexamethylene-diisocyanate, and so forth.

Examples of medium- or high-molecular-weight polyisocyanates are those compounds, with various degrees of condensation, which may be obtained by means of the phosgenation of aniline-formaldehyde condensates. These products are constituted by mixtures of polymethylenepolyphenyl-iscocyanates having the general formula:

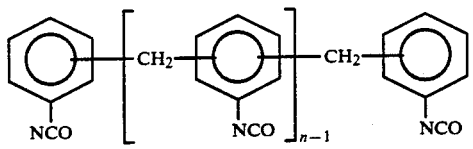

(II)

wherein n represents an integer higher than or equal to 1.

Particularly preferred polyisocyanates are mixtures of poly-methylene-polyphenyl-isocyanates having an average functionality of 2.6 to 2.8. Such products are marketed under various names, such as "Tedimon 31" by Montedipe, "PaPi" by Upjohn, and "Mondur MR" by Mobay.

It is known to use both aliphatic and aromatic diisocyanates and polyisocyanates, in particular as aqueous emulsions, as binding agents for preparing wood composites, as disclosed, e.g., in European patent application No. 0,013,112.

The emulsions may be sprayed onto layers of wood chips used to produce particle boards, and the so-obtained mat is then subjected to the action of temperature and pressure in order to prepare the desired end composite.

In order to use the polyisocyanates as aqueous emulsions as binding agents in wood composites, it is very important that such emulsions do not have a too limited time of chemical-physical stability, in order to be able to cope with the not always foreseeable contretemps which may occur during the course of the industrial processes.

The term "chemical-physical stability" refers both to the characteristic of the emulsions, as such, of remaining unaltered over time, and to the substantial chemical stability over time of the isocyanate groups as regards their reaction with water.

In the pertinent technical literature, many examples have been proposed of techniques suitable for imparting to these emulsions stability and/or for endowing the isocyanate groups with compatibility with water; for example, German patent application No. 2,703,271 discloses the use of polyglycols having a molecular weight within the range of from 4,000 to 20,000 as emulsifiers for polyisocyanates; German patent No 2,724,364 discloses the use of a polyvinyl alcohol having a molecular weight within the range of from 5,000 to 100,000; European patent application No. 0,166,264 discloses the use of polyglycols having a molecular weight within the range of from 350,000 to 600,000 as polyisocyanate emulsifiers; German patent application No. 2,831,674 discloses the use of poly-vinyl-pyrrolidone; and, finally, German patent application No. 3,201,11 discloses the use of commercial emulsions of paraffin in water for preparing the polyisocyanate emulsions.

However, the above techniques known from the prior art lead to compositions which do not have the desired conditions of chemical and physical stability.

British patent No. 1,444,933 discloses the preparation of aqueous emulsions of polyisocyanates, in which the emulsifier is obtained by means of the reaction between a portion of the same isocyanate, and an alkyl-ether of a polyethylene glycol.

The emulsifier may be separately prepared, and used "internally" to the polyisocyanate, i.e., it can be admixed with the polyisocyanate, and the whole mixture is then poured into water with stirring; or, the emulsifier may be used "externally" to the polyisocyanate, i.e., an aqueous solution of the emulsifier is prepared, and the polyisocyanate is added to it in a metered amount, with stirring.

A different form of internal use of the emulsifier is constituted by the formation in situ of the same emulsifier by means of the reaction of an aliquot of polyisocyanate with a glycol derivative.

This technique of preparation, as well as other similar techniques, mentioned in other patents, e.g., in European patent application No. 0,095,594, is always affected by the problem of the limited chemical and physical stability of the emulsions, besides the complexity and the cost of preparation of specific emulsifiers.

In accordance with the present invention, it has now been discovered that the drawbacks which affect the techniques known from the prior art may be overcome by using emulsifying agents which are cellulose derivatives.

Therefore, the objects of the present invention are aqueous emulsions of polyisocyanates comprising at least one cellulose derivative dissolved in water, and at least one organic polyisocyanate.

The cellulose derivative is dissolved in water, at room temperature, in an amount within the range of from 0.1 to 10% by weight, and preferably of from 0.5 to 5% by weight, based on the total weight, with mechanical stirring.

Cellulose derivatives which are particularly suitable for obtaining the emulsions according to the present invention are the water-soluble cellulose ethers described in Kirk-Othmer, "Encyclopaedia of Chemical Technology", 2nd edition, Vol. 4, page 616. Examples of such products are carboxymethyl-celluloses; carboxy-methyl-hydroxy-ethyl-celluloses; hydroxy-ethyl-celluloses; methyl-celluloses; methyl-hydroxy-propyl-celluloses; ethyl-hydroxy-ethyl-celluloses; methyl-ethyl-celluloses; methyl-hydroxy-ethyl-celluloses; and so forth.

Particularly preferred cellulose ethers are carboxy-methyl-celluloses and carboxy-methyl-hydroxy-ethyl-celluloses.

Still more preferred cellulose ethers are the carboxy-methyl-celluloses with a substitution degree higher than 0.5, generally of around 0.8, having a viscosity of their solutions at 2% in water, as measured by means of the Hoeppler viscometer at 20° C., within the range of from 10 to 45,000 mPa.s, and a pH lower than 8, and more generally within the range of from 6 to 8.

To the aqueous solution of the cellulose derivative, the polyisocyanate is added with stirring and at a constant temperature, and the system is then maintained with a high stirring speed, e.g., higher than 8,000 rpm, over short times, generally within the range of from 5 to 60 seconds.

The polyisocyanate may be added to the solution in an amount greater than 5% by weight, relative to the total weight of the end emulsion; however, the polyisocyanate is preferably added in amounts within the range of from 5 to 60%.

The so-obtained emulsions are, surprisingly, endowed with a high degree of both chemical and physical stability, in the most favorable cases, of up to more than 30 hours, such as to permit them be used as binding agents for cellulosic materials on a large industrial scale, with no risks of product loss, and/or of damaging of the facilities, even in case of stoppages due to unforeseen events.

Another advantage of the present invention is that it makes it possible for stable emulsions to be obtained with very limited amounts of stabilizer, and without resorting to expensive and complex processes.

The chemical stability of the emulsion is measured by means of the determination of residual —NCO groups, according to ASTM D 2572-80, and the physical stability is verified both by means of measurements of viscosity with the FORD cup (diameter 4 mm, ASTM D 1200-82), and on the basis of the absence of evident separations or settlings.

The aqueous emulsions according to the present invention may advantageously be used as binders for cellulosic materials, preferably wood-cellulosic materials, such as wood, bark, residues from cane sugar extraction, straw, bamboo, rice chaff, and so forth, as granulates, chips, fibers or meals, or, more generally, in the manufacturing of particle boards, or such other composites as plywoods, fiberboards, blackboards, and so forth, without any problems for the industrial operators or for the storability of the same emulsions.

The emulsion is preferably added to the woodcellulosic material in an amount within the range of from 2 to 50% by weight, relative to the weight of the cellulosic material, and generally from 5 to 20%.

In order still better to understand the present invention, and to practice it, some exemplifying but nonlimitative examples are reported below.

EXAMPLE 1

To 600 g of an aqueous solution at 1.18% of carboxymethyl-cellulose (CMC) having a degree of substitution of 0.82, a Hoeppler viscosity of the aqueous solution at 2%, measured at 20° C., of 100 mPa.s, and a pH=6.4, 400 g of polymethylenepolyphenyl-isocyanate (Tedimon 31) is added with stirring.

The so-obtained dispersion is subjected to high-speed stirring for a maximum time of 30 seconds.

The emulsion obtained has characteristics as reported in Table 1.

EXAMPLE 2

To 600 g of an aqueous solution at 1.07% of carboxymethyl-cellulose (CMC) having a degree of substitution of 0.84, a Hoeppler viscosity of the aqueous solution at 2%, measured at 20° C., of 200 mPa.s, and a pH=6.8, 400 g of polymethylenepolyphenyl-isocyanate (Tedimon 31) is added.

The dispersion is treated as in Example 1.

The characteristics are reported in Table 1.

EXAMPLE 3

To 600 g of an aqueous solution at 0.75% of carboxymethyl-cellulose (CMC) having a degree of substitution of 0.79, a Hoeppler viscosity of the aqueous solution at 2%, measured at 20° C., of about 2500 mPa.s, and a pH=7.8, 400 g of polymethylene-polyphenyl-isocyanate (Tedimon 31) is added.

The dispersion is treated as in Example 1.

The characteristics are reported in Table 1.

EXAMPLE 4

To 600 g of an aqueous solution at 1.75% of hydroxy-propyl-methyl-cellulose having a Hoeppler viscosity of the aqueous solution at 2%, measured at 20° C., of about 30 mPa.s, 400 g of polymethylene-polyphenyl-isocyanate (Tedimon 31) is added.

The dispersion is treated as in Example 1.

The characteristics are reported in Table 1.

TABLE 1

| Time, hours | Example 1 Viscosity, seconds | Example 1 NCO % | Example 2 Viscosity, seconds | Example 2 NCO % | Example 3 Viscosity, seconds | Example 3 NCO % | Example 4 Viscosity, seconds | Example 4 NCO % |
|---|---|---|---|---|---|---|---|---|
| 0 | 30 | 100 | 35 | 100 | 41 | 100 | 28 | 100 |
| 3 |    |     |    |     | 41 | 100 | 28 | 100 |
| 4 | 31 | 97.5 | 35 | 96.4 | 41 | 95.9 | 27 |    |
| 7 |    |     |    |     | 41 | 94.3 | 27 |    |
| 8 |    |     |    |     | 41 |     | 27 | 98.7 |
| 9 |    |     |    |     | 41 | 93.5 | 27 |    |

TABLE 1-continued

| Time, hours | Example 1 Viscosity, seconds | Example 1 NCO % | Example 2 Viscosity, seconds | Example 2 NCO % | Example 3 Viscosity, seconds | Example 3 NCO % | Example 4 Viscosity, seconds | Example 4 NCO % |
|---|---|---|---|---|---|---|---|---|
| 10 | 31 | 95 | 36 | 95.1 | | | | |
| 13 | | | | | 45 | 92.7 | 26 | |
| 16 | 34 | 89.2 | 39 | 92.2 | 54 | 91.9 | 25 | 96.1 |
| 21 | 36 | 86.7 | 44 | 89.3 | | | | |
| 26 | 42 | 85.8 | 51 | 85.5 | | | | |
| 30 | 51 | 83.3 | 77 | 85 | | | | |

Note:
the viscosity is measured by means of a Ford cup, of 4 mm diameter, at 20° C., according to ASTM D 1200-82.

EXAMPLE 5 a) 3,000 g of wood chips of the type used in the industry for the outer layers of panels, and containing about 5-6% of water, are charged to a resin-applying machine, and onto the chips 400 g of the isocyanic emulsion as in Example 1, diluted to a content of dry matter of 30%, is sprayed through suitable nozzles.

b) The above operation is repeated with 3,000 g of wood chips of the type used in industry for the inner layers of the panels, and containing 5-6% of water; 200 g of isocyanate emulsion (as produced in Example 1), diluted to 30% of dry matter, is sprayed.

On the sheet which performs the function of supporting the mattress, a layer of 700 g of chips as defined under (a), then 1,400 g of chips as defined under (b), and again 700 g of chips as defined under (a), are laid.

The mattress is then charged to a press, in which it is subjected to a temperature of 175° C.+5° C. for 4 minutes.

A chipboard panel of V 20 type (DIN 68 763) is obtained, which displays the characteristics reported in Table 2.

The test is repeated by operating as above described for the V 20 panel, but with an isocyanate emulsion with a content of 40% dry matter, and respectively using 600 g of emulsion per 3,000 g of chips for the external layers, and 450 g of emulsion per 3,000 g of chips for the internal layer of the particle board.

A particle board of V 100 type (DIN 68 763) is obtained, which has the characteristics reported in Table 2.

TABLE 2

| | V 20 | V 100 |
|---|---|---|
| Bending strength kg/cm² | 182 | 195 |
| Tensile strength kg/cm² | 6.1 | 3.6 |
| Swelling % | 14.3 | 8.8 |
| Specific gravity kg/m³ | 671 | 668 |
| Thickness mm | 16 | 16 |

What is claimed is:

1. Stabilized aqueous emulsion for use as a binding agent in wood composites consisting of at least one organic polyisocyanate and at least one cellulose ether dissolved in water,
   the cellulose ether is selected from the group consisting of a carboxy-methyl-cellulose having a substitution degree higher than 0.5, a viscosity of solution at 2% in water, measured by means of the Hoeppler viscometer at 20° C., within the range of from 10 to 45,000 mPa.s, and a pH value lower than 8, carboxy-methyl-hydroxy-ethyl-cellulose, and carboxy-methyl-hydroxy-ethyl-cellulose and wherein the organic polyisocyanate is added to the aqueous solution of said cellulose ether with a stirring speed higher than 8,000 rpm for times within the range of from 5 to 60 seconds.

2. The emulsion according to claim 1, wherein the cellulose ether is dissolved in water in an amount within the range 0.1 to 10% by weight, based on the total weight.

3. The emulsion according to clai 2, wherein from 0.5 to 5% by weight of cellulose ether is dissolved in water.

4. The emulsion according to claim 1, wherein the cellulose ether is water-soluble.

5. The emulsion according to claim 1, wherein the polyisocyanate is added in an amount greater than 5% by weight, relative to the total weight.

6. The emulsion according to claim 5, wherein the polyisocyanate is added in an amount within the range of from 5 to 60% by weight.

7. The emulsion according to claim 1, wherein the carboxy-methyl-cellulose has a substitution degree of about 0.8 and a pH within the range of from 6 to 8.

8. Stabilized aqueous emulsion for use as a binding agent in wood composites consisting of at least one organic polyisocyanate and at least one cellulose ether dissolved in water,
   the cellulose ether is selected from the group consisting of carboxy-methyl-cellulose; carboxy-methyl-hydroxy-ethyl-cellulose; hydroxy-ethyl-cellulose; methyl-cellulose; methyl-hydroxy-propyl-cellulose; ethyl-hydroxy-ethyl-cellulose, and wherein the organic polyisocynate is added to the aqueous solution of said cellulose ether with a stirring speed higher than 8,000 rpm for times within the range of from 5 to 60 seconds.

* * * * *